Figure 1:
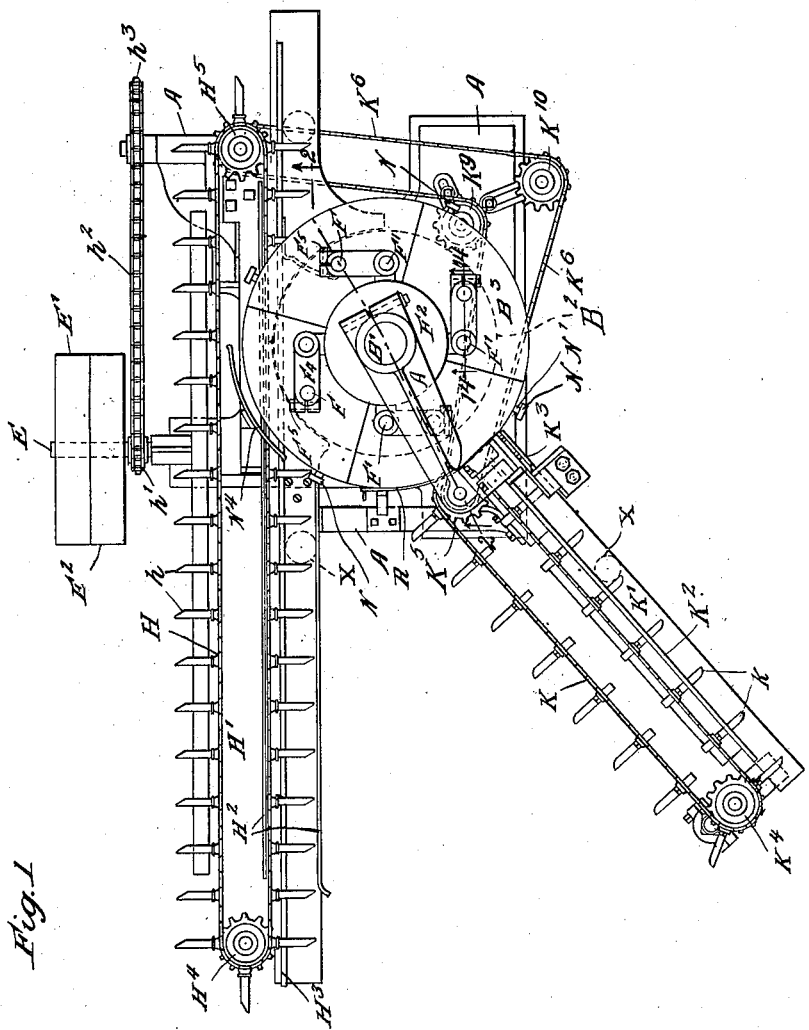

No. 812,858. PATENTED FEB. 20, 1906.
A. LOTZ.
AUTOMATIC ROUND CAN HEADING AND CRIMPING MACHINE.
APPLICATION FILED MAR. 19, 1904.

8 SHEETS—SHEET 1.

Witnesses:
Wm. Geiger
H. W. Munday

Inventor.
Augustus Lotz
By Munday, Evarts & Adcock.
Attorneys

No. 812,858. PATENTED FEB. 20, 1906.
A. LOTZ.
AUTOMATIC ROUND CAN HEADING AND CRIMPING MACHINE.
APPLICATION FILED MAR. 19, 1904.

8 SHEETS—SHEET 5.

Witnesses:
Wm. Geiger
H. W. Munday

Inventor:
Augustus Lotz
By Munday, Evarts & Adcock.
Attorneys

No. 812,858. PATENTED FEB. 20, 1906.
A. LOTZ.
AUTOMATIC ROUND CAN HEADING AND CRIMPING MACHINE.
APPLICATION FILED MAR. 19, 1904.
8 SHEETS—SHEET 6.
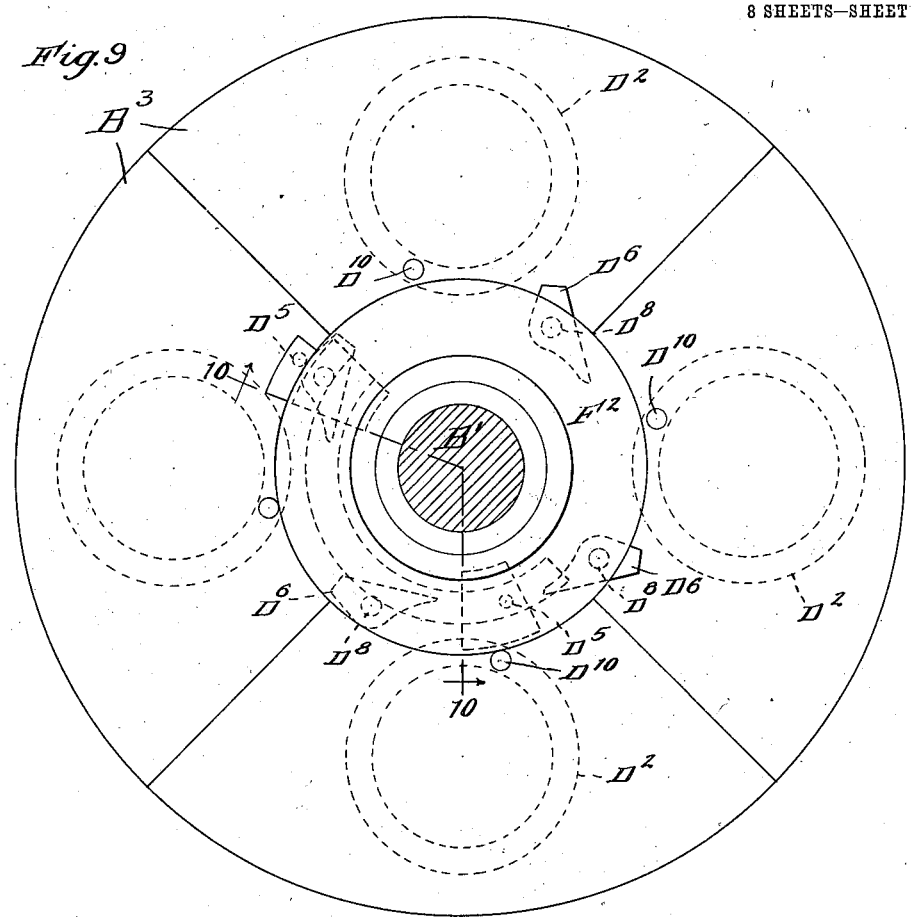
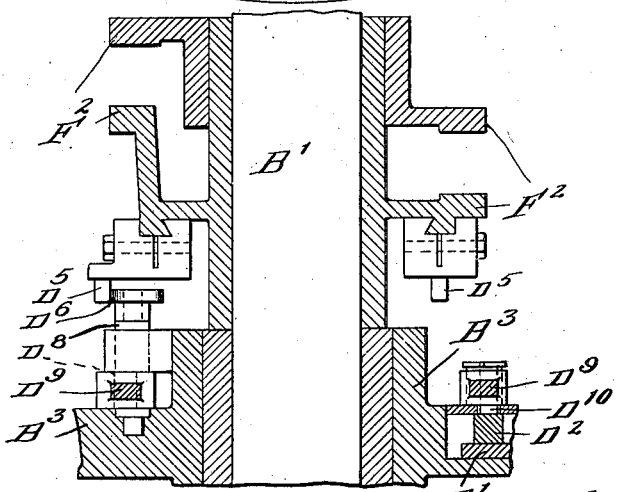
Witnesses:
Wm. Geiger
H. W. Munday
Inventor:
Augustus Lotz
By Munday, Evarts & Adcock,
Attorneys No. 812,858. PATENTED FEB. 20, 1906.
A. LOTZ.
AUTOMATIC ROUND CAN HEADING AND CRIMPING MACHINE.
APPLICATION FILED MAR. 19, 1904.

8 SHEETS—SHEET 7.

Witnesses:
Wm. Geiger
A. W. Munday

Inventor:
Augustus Lotz
By Munday, Evarts & Adcock
Attorneys

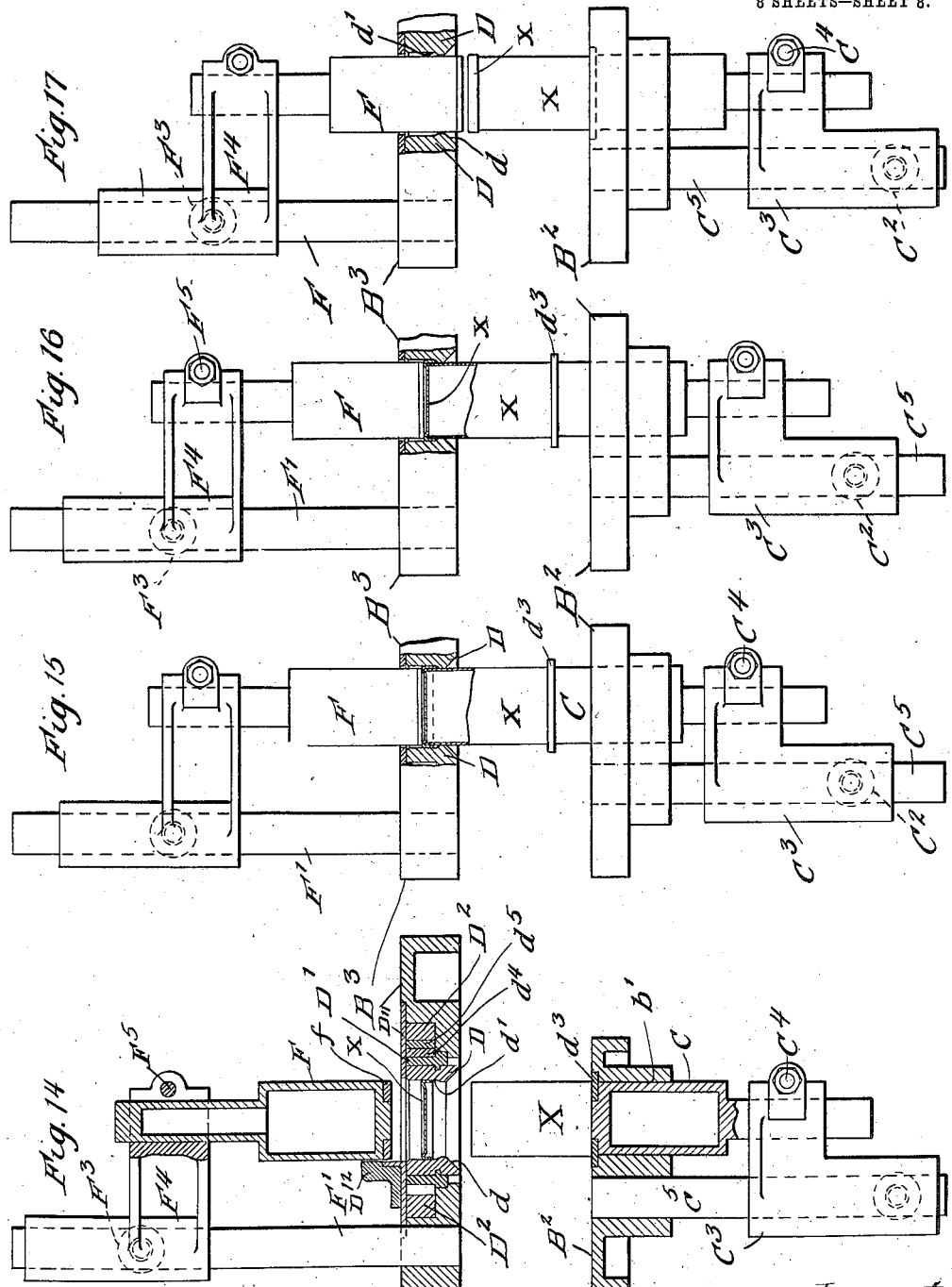

UNITED STATES PATENT OFFICE.

AUGUSTUS LOTZ, OF SAN FRANCISCO, CALIFORNIA, ASSIGNOR TO AMERICAN CAN COMPANY, OF JERSEY CITY, NEW JERSEY, A CORPORATION OF NEW JERSEY.

AUTOMATIC ROUND-CAN HEADING AND CRIMPING MACHINE.

No. 812,858.      Specification of Letters Patent.      Patented Feb. 20, 1906.

Application filed March 19, 1904. Serial No. 198,892.

*To all whom it may concern:*

Be it known that I, AUGUSTUS LOTZ, a citizen of the United States, residing in San Francisco, in the county of San Francisco and State of California, have invented a new and useful Improvement in Automatic Round-Can Heading and Crimping Machines, of which the following is a specification.

My invention relates to can heading and crimping machines.

The object of my invention is to provide a can heading and crimping machine of a simple, efficient, and durable construction by means of which the final head or cover may be automatically applied to filled cans and properly crimped thereon rapidly and cheaply.

A further object is to provide a combined can heading and crimping machine in which the heading and crimping operations may be performed by one and the same set of jaws, thus simplifying the construction of the machine and increasing its capacity.

A still further object is to provide a can heading and crimping machine in which the can-body carrier or feed-wheel has a continuous movement at different speeds, its movement being slow at the time the heads and bodies are being received and its movement quick at other portions of its travel, thus materially increasing the speed and capacity of the machine.

My invention consists in the means I employ to practically accomplish these objects or results—that is to say, it consists in a combined can heading and crimping machine having opening and closing heading-jaws adapted to receive the can-head and furnished with bevel-faces for sizing and rounding the can-body and centering the same with the head and also with an additonal bevel-face for subsequently crimping the flange of the can-head on the can-body after the heading operation is completed by the longitudinal movement of the headed can in the combined heading and crimping jaws.

It further consists in the combined heading and crimping jaws in combination with a heading-plunger for forcing the can-body and head together to apply the head to the can-body and a crimping-plunger for forcing the headed can against the crimping-jaws, and thus crimping the can.

It further consists, in connection with the can-body-feed device and a can head or cover feed device, of a continuously-moving carrier having a slow movement to receive the can-bodies and can-heads and a quick movement at other times to facilitate the operation and increase the capacity of the machine.

It further consists in the novel construction of parts and devices and in the novel combinations of parts and devices herein shown or described.

Figure 2:
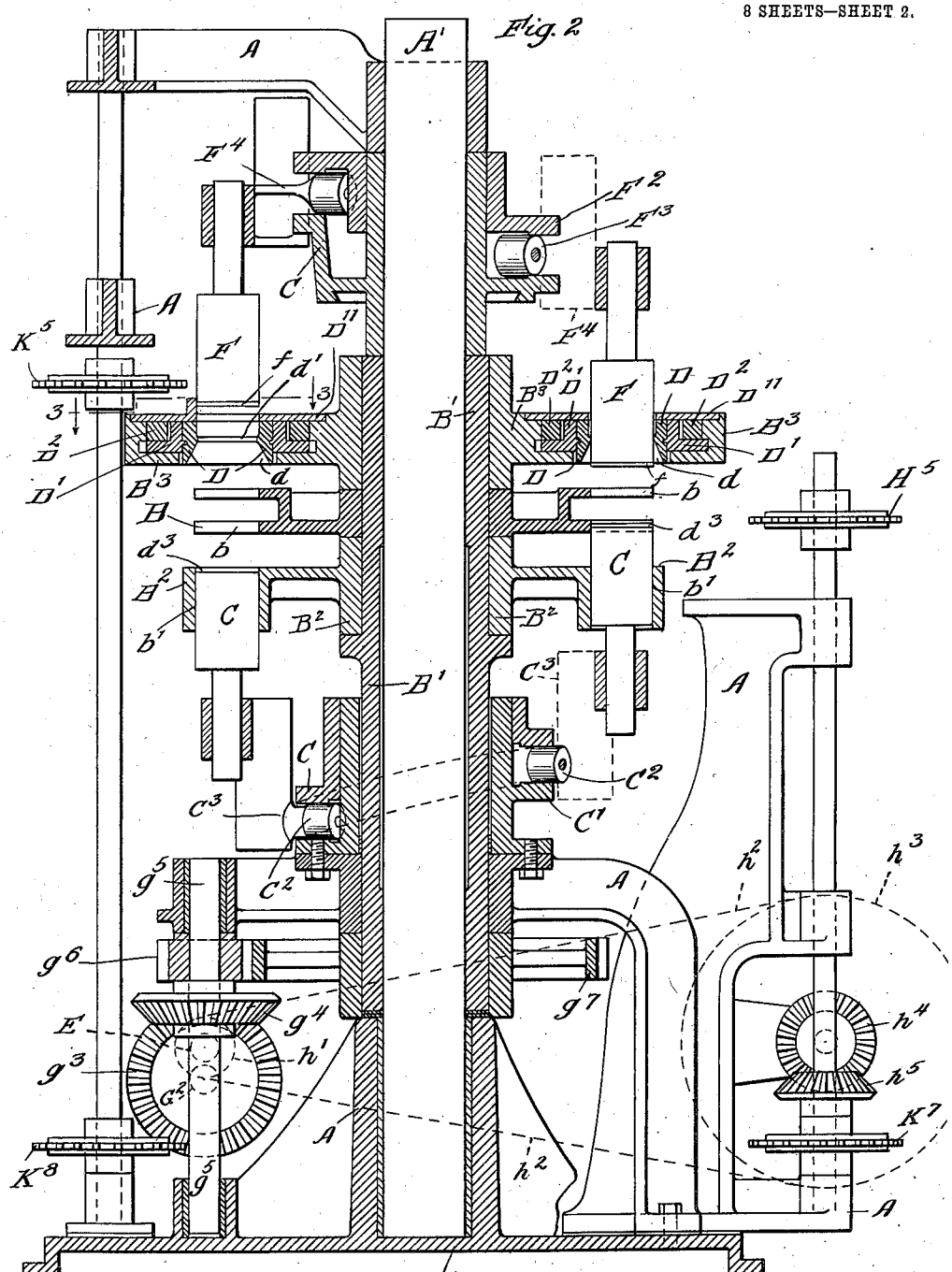
Figure 3:
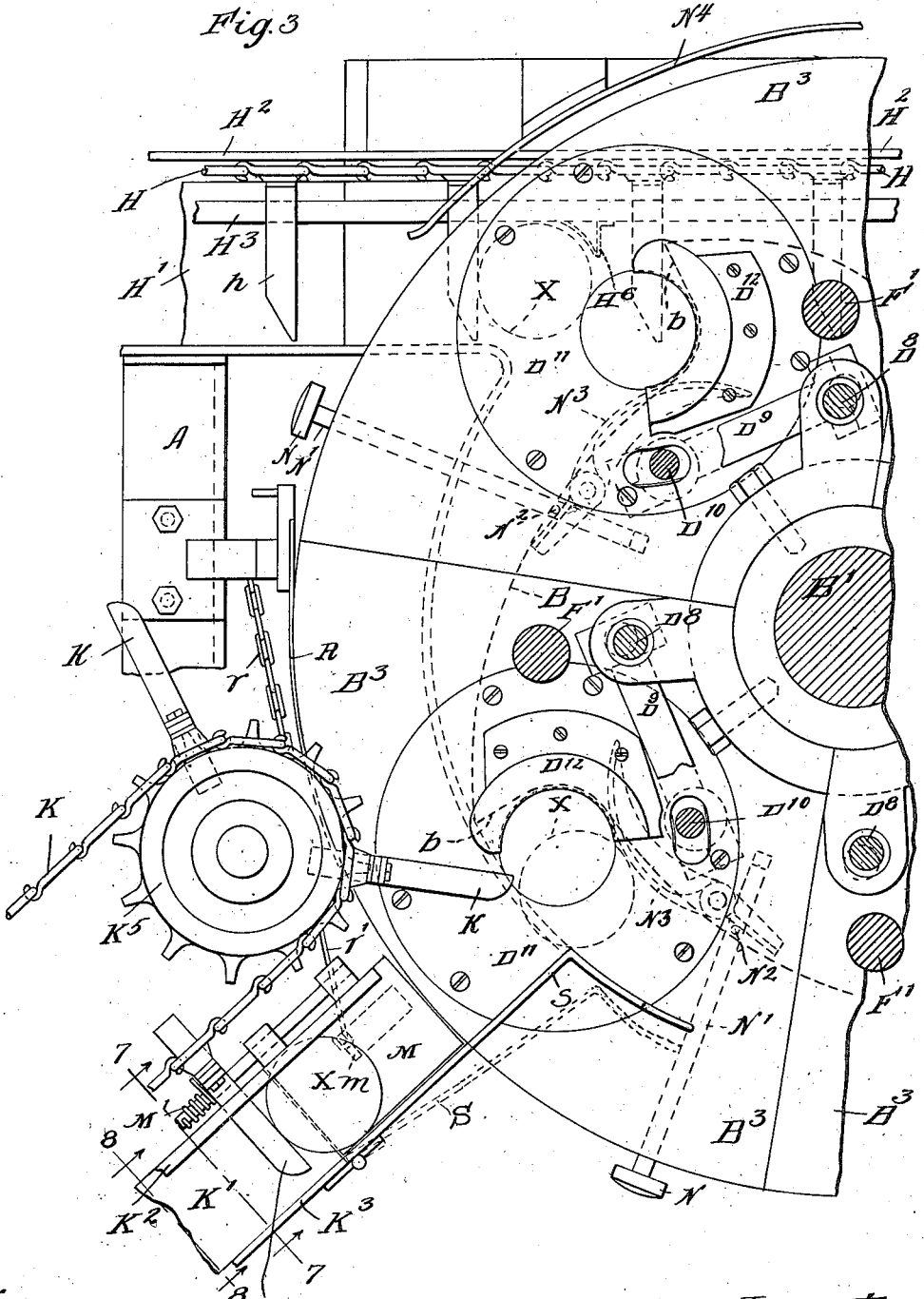
Figure 4:
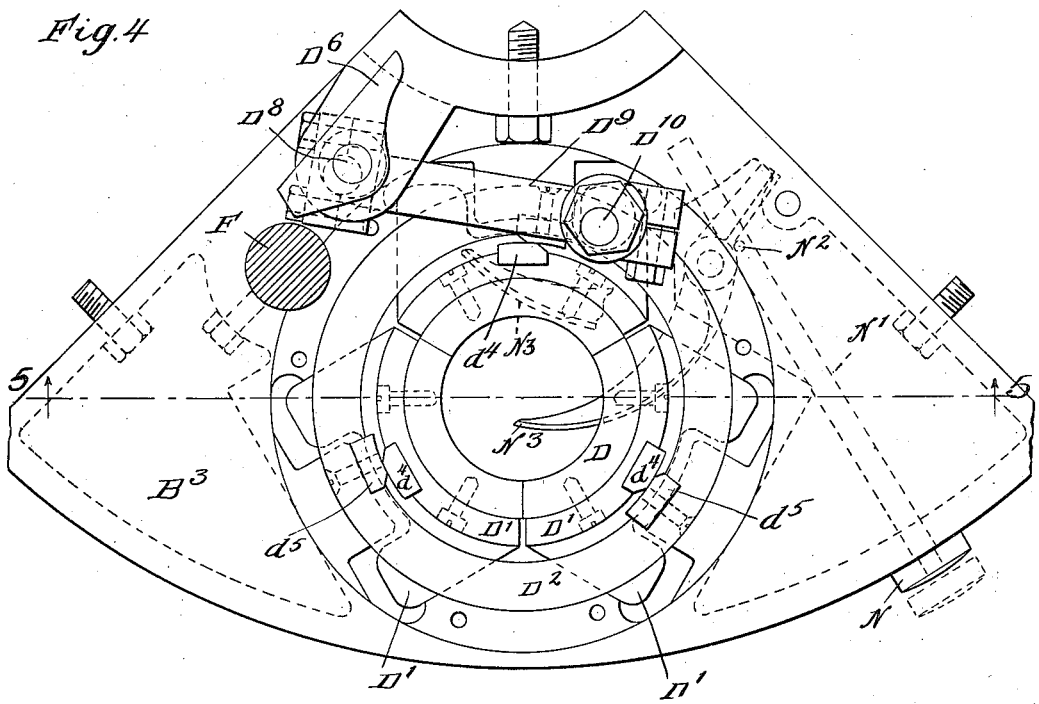
Figure 5:
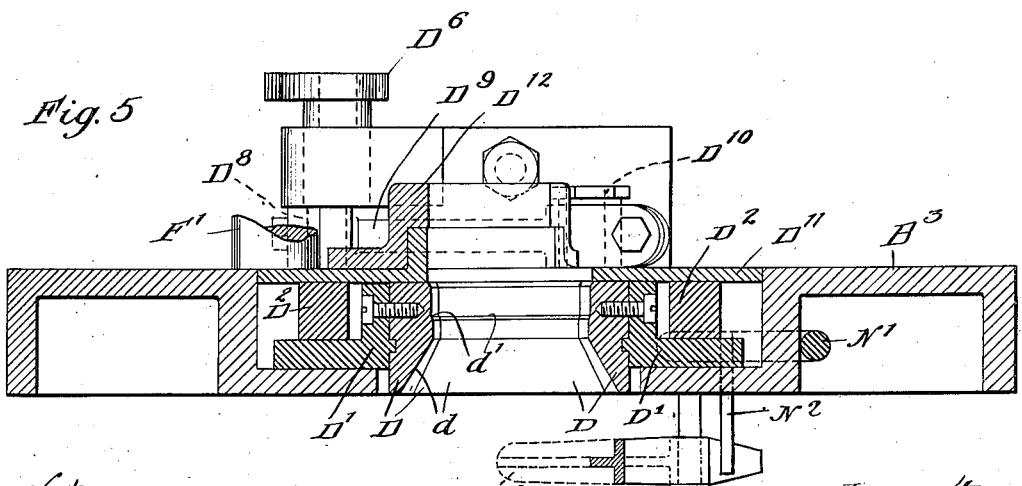
Figure 6:
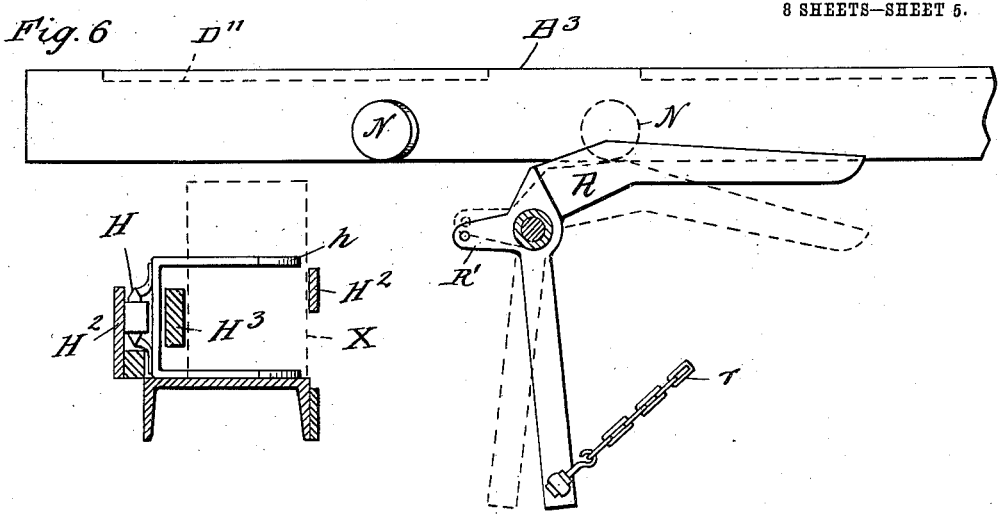
Figure 7:
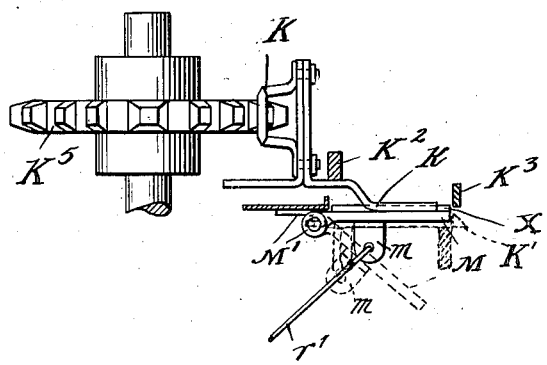
Figure 8:
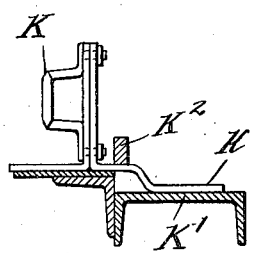
Figure 11:
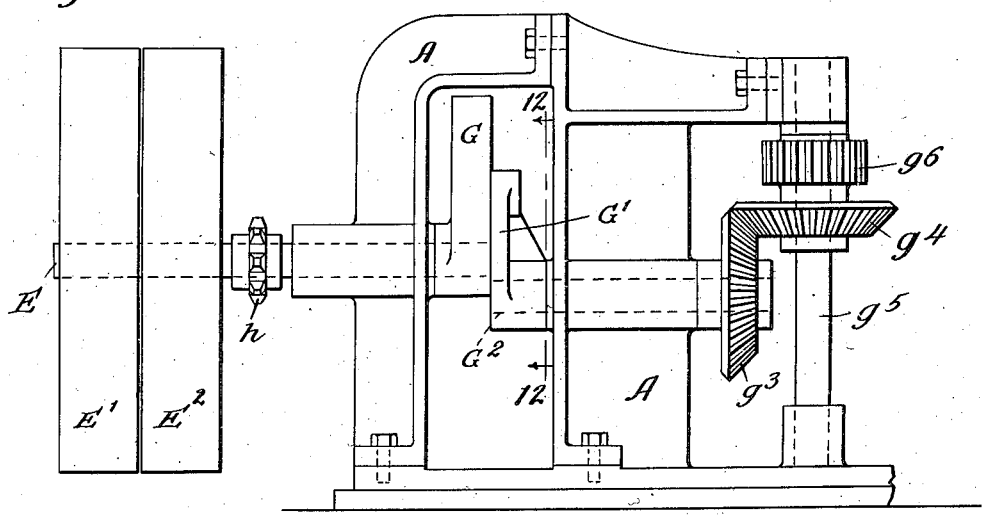
Figure 12:
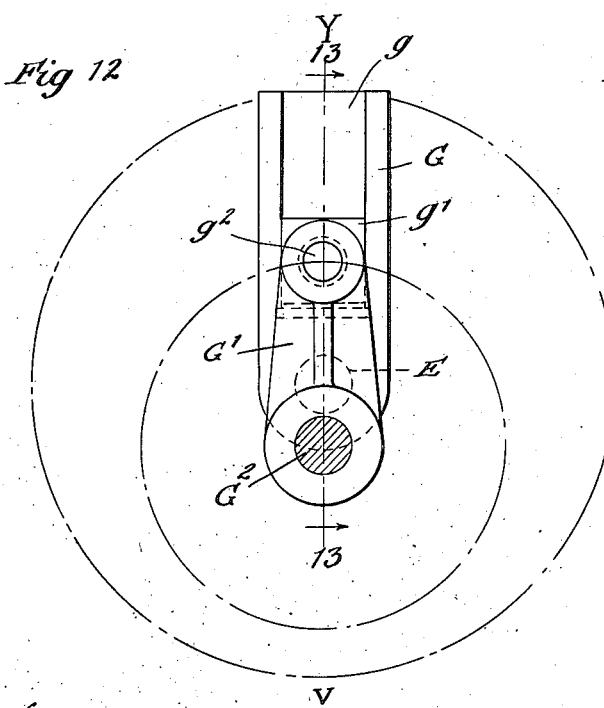
Figure 13:
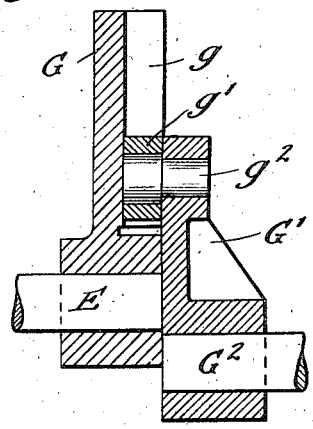

In the accompanying drawings, forming a part of this specification, Figure 1 is a plan view of a combined can-body heading and crimping machine embodying my invention. Fig. 2 is a vertical section on line 2 2 of Fig 1. Fig. 3 is a partial horizontal section on line 3 3 of Fig. 2. Fig. 4 is a detail plan view showing one set of heading and crimping jaws and the parts coöperating therewith. Fig. 5 is a detail section on line 5 5 of Fig. 4. Fig. 6 is a detail diagram view illustrating the operation of the can-head-discharge trigger. Fig. 7 is a detail view, partly in elevation and partly in cross-section, on line 7 7 of Fig. 3, the bottom of the can-head runway being indicated in dotted lines in order to more clearly show the other parts. Fig. 8 is a detail cross-section on line 8 8 of Fig. 3. Fig. 9 is a detail plan view illustrating the opening and closing of the heading and crimping jaws. Fig. 10 is a section on line 10 10 of Fig. 9. Fig. 11 is a detail elevation showing the speed-varying mechanism. Fig. 12 is a detail section on line 12 12 of Fig. 11. Fig. 13 is a detail section on line 13 13 of Fig. 12. Fig. 14 is a detail vertical section showing the heading and crimping jaws, heading-plunger and crimping-plunger, the section being on line 14 14 of Fig. 1 and showing the position of the parts before the heading operation begins. Figs. 15, 16, and 17 are views similar to Fig. 14, showing the parts in different positions and illustrating the operation.

In the drawings, A represents the frame of the machine, the same being of any suitable form to give support to the other parts and preferably having an upright standard or non-rotating shaft A'.

B is a continuously-rotating carrier or can-body-feed wheel secured to the continuously-rotating hollow shaft B' and preferably made for convenience of construction in three separate sections, the lower section B² and the upper section B³ of the carrier being, however, all connected to the middle section B by the shaft B'. The carrier B is preferably provided with four can-body pockets $b$, and its lower section or can receiving and supporting plate B² is provided with guides or openings $b'$ for a corresponding number of heading-plungers C, by which the can-bodies or filled cans X are pushed upward into the can heading and crimping jaws D and into the can-heads $x$, contained therein. The can heading and crimping jaws D are mounted upon the upper section B³ of the carrier B. There are four sets of opening and closing can heading and crimping jaws D, corresponding to the number of can-body pockets $b$ of the carrier, and the same are mounted on the upper section or disk B³ of the carrier, the said section B³ also having guides F' for the four crimping-plungers F.

The opening and closing segmental heading and crimping jaws D each have flaring or conical heading-faces $d$, which serves to true up, size, and round the can-body or the upper edge or mouth thereof and accurately center the same with and guide the same into the can head or cover $x$ as the can-body is pushed up into and through the closed heading-jaws D D and into the can-head $x$, contained therein. The combined heading and crimping jaws D are also furnished each with an oppositely-turned beveled shoulder or crimping-face $d'$, which serves as a stop to level or true up the can-head $x$ in the jaws D, in connection with the upper or crimping plunger F, preparatory to the can-body being forced into the can-head in the heading operation and which also serves after the heading operation has been completed to snugly crimp the can-head flange against the can-body on the can by the further downward movement of the crimping-plunger F. The can is thus both headed and crimped by the combined operation of the jaws D and plungers C F.

The heading-plungers C are preferably four in number, corresponding to the can-pockets $b$ in the carrier-wheel B, and the same are reciprocated as required to push the can-bodies within the heading-jaws and perform the heading operation and then to permit the headed can to be moved downward by the upper or crimping plunger to perform the crimping operation and to permit the headed or crimped can to be discharged by means of a stationary cam C' on the frame of the machine, which is engaged by a roller C² on an arm C³, adjustably connected to the heading-plunger C by a clamp-bolt C⁴ and guided by the guide C⁵, mounted on supporting-plate B².

The upper or crimping plungers F are reciprocated, as required, as the carrier B rotates continuously by a stationary cam F² on the frame of the machine, which is engaged by a roller F³ on an arm F⁴, adjustably connected to the plunger F by a clamp-bolt F⁵. The heading and crimping plungers D and F are each preferably furnished with a removable steel operating-face $d^3$ and $f$, respectively.

The segmental combined heading and crimping jaws D are preferably three in number for each set, each segment being a third of a circle, although a greater or less number of segments may be employed. The jaws D may be opened and closed by any suitable means. I prefer, however, to employ for this purpose interengaging guides $d^4 d^5$, the guides $d^4$ being on the connecting guide-segments D' and the guides $d^5$ being on the jaw-closing oscillating ring D², which surrounds the jaws D. The jaw-closing ring D² is oscillated, as required, to operate the jaws D by a stationary cam, pin, or projection D⁵ on the stationary cam F², engaging an arm D⁶ on an eccentric D⁸ and eccentric-strap D⁹, connected at D¹⁰ to the oscillating ring D².

The can-body carrier or feed wheel B and its upright shaft B' and parts carried thereby are continuously rotated from the driving-shaft E, having fast and loose pulleys E' and E², through a high and low speed connecting mechanism, so that the shaft may be rotated at the necessary slow speed at the time the can-bodies and can-heads are being received thereon and at a high speed at other times, so that the capacity of the machine may thus be materially increased. This high and low speed connecting mechanism between the driving-shaft E and the turret or can-body-carrier shaft B' may be of any suitable form. It, however, preferably comprises two crank-arms G G', one, G, carried by the driving-shaft E and furnished with a slot $g$ and a block $g'$, sliding in said slot, and the other crank-arm G' being on a shaft G² and pivotally connected to the block $g'$ by a pivot-stud $g^2$ on said block. The shaft G² is a short shaft journaled on the frame of the machine and has a bevel-gear $g^3$ meshing with the bevel-gear $g^4$ on a shaft $g^5$, having a spur-gear $g^6$, which meshes with a gear $g^7$ on the shaft B'. By this means the speed of the carrier-shaft B' is caused to increase while the crank-arm G moves from Y to V, as shown in Fig. 12, and decreases while the crank-arm G moves from V to Y.

The can-bodies are automatically delivered into the pockets of the carrier B and onto the can-supporting plate B² as the carrier revolves continuously by means of an endless can-body feeder H, having fingers $h$ to push the cans along the horizontal guideway H', which is furnished with guide-rails H² H³. The guideway H' is on a level or flush with the plate or disk B². The guide-rail H³ of the can-body guideway H' is furnished with a curved or projecting portion H⁶ (shown in dotted lines in Fig. 3) to deflect the foremost can-body into the pocket $b$ of the carrier B as the can-bodies are pushed along the guideway H' by the arm $h$ of the can-body feeder H. The can-body feeder H is preferably an endless chain and travels on sprocket-wheels $H^4$ $H^5$, the sprocket-wheel $H^5$ receiving a continuous motion from the driving-shaft E through sprocket-wheels $h'$, chain $h^2$, sprocket-wheel $h^3$, and intermeshing gears $h^4 h^5$. The can heads or covers $x$ are automatically delivered onto the can-head-guide plate $D^{11}$ and can-head guide $D^{12}$ and into the heading-jaws by a can-head feeder K and can-head runway K', having guide-rails $K^2$ $K^3$. The can-head feeder K is preferably an endless chain having fingers $k$ for pushing the can-heads along and travels on sprocket-wheels $K^4$ $K^5$, the wheel $K^5$ being driven by a chain $K^6$, connecting the sprocket-wheels $K^7$ $K^8$ and passing around sprocket-wheels $K^9$ and $K^{10}$.

To prevent a can-head being fed unless a can-body is present in the carrier B to receive it, the can-head runway is provided with a trap-door M, which is operated to discharge the can-head unless a can-body is present in the carrier to receive it. This trap-door M is thus automatically opened by a movable can-cover-discharge device, consisting of a roller N, mounted on a shaft N', carrying a pin $N^2$, engaging the arm $N^3$, mounted on the disk $B^3$, the roller N being normally retracted by a guide $N^4$, mounted on the frame of the machine, said roller N, through the arm $N^3$, being engaged and operated by the can-body if a can-body is present in the carrier B. If, however, no can-body is present in the carrier B to receive a cover, the cover-discharge device N is not extended, and as the carrier B moves forward to the can-head-receiving station said device N engages a trigger R, preferably in the form of a bell-crank lever, which is connected by a chain $r$ and rod $r'$ to an arm $m$ on the trap M, thus opening the trap and permitting the cover to be discharged into a basket or receptacle below. The trigger R has an arm R', to which a spring may be attached for holding the same in its normal position. A spring M' holds the trap M normally closed. The can top or cover guideway K' has a spring-held guide extension S to steer or guide the can top or cover into position, this spring-guide S yielding to permit the escape of a defective cover, and thus preventing clogging the machine or injury to the can. The spring-guide S is located just above the surface of the carrier-disk $B^3$.

The operation is as follows: The can-bodies are fed one by one into the pockets of the continuously-rotating carrier B on top of the heading-plungers C, and the can-heads are fed one by one onto the carrier and into the heading and crimping jaws D and underneath the crimping-plungers F, the heading and crimping jaws D being at this time closed to prevent the can-heads from dropping through the same. The crimping-plunger then as the carrier rotates moves down to level and evenly seat the can-head in the heading-jaws and hold it just over the crimping-shoulder $d'$ of the heading-jaws. The heading-plunger C is then moved upward as the carrier B rotates and pushes the can-body through the lower or heading bevel-face $d$ of the jaws D into the can-head, thus heading the can. The heading-plunger C and crimping-plunger F then both move downward together, thereby causing the upper or crimping bevel-face $d'$ of the jaws D to crimp the can-head on the can-body as the headed can is forced downward through the heading and crimping jaws into position for being discharged horizontally from the carrier as the further revolution of the carrier brings it to the discharge-chute. The operation is thus continuous, and the cans may thus be headed and crimped very rapidly, and the capacity of the machine is still further increased by the accelerated speed of the carriers at other parts of its revolution except at the can head and body receiving and can-discharging positions.

I claim—

1. In a machine for heading and crimping filled cans, the combination with a turret or carrier for the cans, of a plurality of lower or heading plungers, a plurality of upper or crimping plungers, a plurality of sets of segmental opening and closing heading-jaws, furnished with bevel-faces for guiding the can-bodies into the can-heads, and with bevel-shoulders for crimping the flanges of the heads on the headed cans, means for feeding or delivering the can-bodies onto the carrier, and means for feeding or delivering the can heads or covers into the heading-jaws, means for discharging a cover when no can-body is present in the carrier to receive it, and means for continuously driving the can-carrier shaft at a lower speed while receiving the can-bodies, and at a high speed at other times, substantially as specified.

2. In a can heading and crimping machine, the combination with a pair of opposing or upper and lower movable plungers, of opening and closing segmental combined heading and crimping jaws, the upper plunger first seating the can-head in said jaws, the lower plunger then forcing the can-body through the heading-jaws into the can-head, and the upper plunger then forcing the headed can against the crimping-shoulder of said jaws and crimping the can and discharging it from said jaws, substantially as specified.

3. The combination with a pair of opposing or upper and lower movable plungers, of opening and closing jaws having bevel-faces for guiding the end of the can-body into the cover, and bevel-shoulders for crimping the cover on the can after it is headed, the upper plunger first seating the can-head in said jaws, the lower plunger then forcing the can-body through the heading-jaws into the can-head, and the upper plunger then forcing the headed can against the crimping-shoulder of said jaws and crimping the can and discharging it from said jaws, substantially as specified.

4. The combination with a can-body carrier having a plurality of can-receiving pockets, of a plurality of pairs of opposing or upper and lower movable plungers, and a plurality of sets of opening and closing jaws having inclined or flaring can-heading faces and inclined or flaring crimping-faces, the upper plunger of each pair first seating the can-head in the heading and crimping jaws, the lower plunger of each pair then forcing the can-body through the crimping-jaws into the can-head, and the upper plunger of each pair then forcing the headed can past the crimping-shoulder of the heading-jaws and out of said jaws, substantially as specified.

5. The combination with a can-body carrier having a plurality of can-receiving pockets, of a plurality of pairs of opposing or upper and lower movable plungers, a plurality of sets of opening and closing jaws having inclined heading-faces and inclined crimping-faces, and a can-body feeder, the upper plunger of each pair first seating the can-head in the heading and crimping jaws, the lower plunger of each pair then forcing the can-body through the crimping-jaws into the can-head, and the upper plunger of each pair then forcing the headed can past the crimping-shoulder of the heading-jaws and out of said jaws, substantially as specified.

6. The combination with a can-body carrier having a plurality of can-receiving pockets, of a plurality of pairs of opposing or upper and lower movable plungers, a plurality of sets of opening and closing jaws having crimping-faces, a can-body feeder, and a can head or cover feeder, the upper plunger of each pair first seating the can-head in the heading and crimping jaws, the lower plunger of each pair then forcing the can-body through the crimping-jaws into the can-head, and the upper plunger of each pair then forcing the headed can past the crimping-shoulder of the heading-jaws and out of said jaws, substantially as specified.

7. The combination with a can-body carrier having a plurality of can-receiving pockets, of a plurality of pairs of plungers, a plurality of sets of opening and closing jaws having crimping-faces, a can-body feeder, and a can head or cover feeder, said can-head feeder having a can head or cover discharge trap, substantially as specified.

8. The combination with a can-body carrier having a plurality of can-receiving pockets, of a plurality of pairs of plungers, a plurality of sets of opening and closing jaws having crimping-faces, a can-body feeder, a can head or cover feeder, said can-head feeder having a can head or cover discharge trap, said can-body carrier having a device actuated by the presence or absence of the can therein to control the operation of said can-head trap, substantially as specified.

9. The combination with a can-body carrier having a plurality of can-receiving pockets, of a plurality of pairs of plungers, a plurality of sets of opening and closing jaws having crimping-faces, a can-body feeder, a can head or cover feeder, and mechanism for continuously rotating said can-body carrier at different speeds during the can-receiving and can heading and crimping operations, substantially as specified.

10. The combination with a can-body carrier having a plurality of can-receiving pockets, of a plurality of pairs of plungers, a plurality of sets of opening and closing jaws having heading-faces and crimping-faces, a can-body feeder, a can head or cover feeder, mechanism for rotating said can-body carrier, and means for retarding the movement of said carrier while passing the can-body feeder, substantially as specified.

11. In a can-heading machine, the combination with a can carrier or turret, opening and closing heading-jaws carried thereby, heading-plungers, a can-body feeder, a can-head runway furnished with a trap for discharging a can head or cover in case no can-body is present on the carrier to receive it, and means for opening said trap to discharge a cover when no can-body is present, substantially as specified.

12. In a can-heading machine, the combination with a can carrier or turret, opening and closing heading-jaws carried thereby, heading-plungers, a can-body feeder, a can-head runway furnished with a trap for discharging a can head or cover in case no can-body is present on the carrier to receive it, and means for opening said trap to discharge a cover when no can-body is present, said means comprising a movable device N on the carrier, a can-body-operated lever $N^3$ on the carrier for actuating said device, and a trigger R projecting in the path of said movable device N on the carrier and connected with said trap, substantially as specified.

AUGUSTUS LOTZ.

Witnesses:
THOS. R. KENT,
CHARLES E. BULL.